Patented May 19, 1936

2,040,931

UNITED STATES PATENT OFFICE 2,040,931

METHOD FOR PRODUCING ACTIVATED CARBON

Walter Fuchs, Ostrava, Czechoslovakia

No Drawing. Application November 27, 1933, Serial No. 699,920. In Germany January 26, 1933

6 Claims. (Cl. 252—3)

My invention relates to a new and improved method of producing activated carbon.

One of the objects of my invention is to produce an activated carbon with the use of brown coal or lignite, of the like, as starting material.

Another object of my invention is to produce activated carbon, with the use of said type of starting material, which shall have high adsorption properties.

Another object of my invention is to simplify the production of activated carbon from the above mentioned type of starting material, said starting material being preferably in powder or dust form, so that the desired activated carbon can be secured by means of a single heating operation, the final product being highly activated.

Another object of my invention is to de-ash the starting material by means of a suitable treatment, as for example by washing the starting material with hydrochloric acid, and then heating the purified starting material at high temperature, to carbonize the purified starting material.

Another object of my invention is to cause the carbonization of the starting material in the presence of a gas which operates to activate the material.

Other objects of my invention are set forth in the following description, it being understood that the above statement of the objects of my invention is intended to generally explain the same and without limiting the same in any manner.

Likewise, I do not wish to be limited to the specific examples which are later given herein as illustrating the best embodiments of the invention, since numerous changes in procedure and in ingredients may be made, without departing from the spirit of the invention.

Heretofore activated carbon has been made from substances which contain carbon, according to various methods. According to one method, certain specific activating substances were added to the starting material. Such activating substances were, for example, zinc chloride, or phosphoric acid. The starting material, intermixed with said activating substances was then carbonized at a high temperature. It was also common practice to simultaneously subject the material to the action of an activating gas, or vapor, such as steam, carbonic acid, chlorine, etc. The product which was thus secured was freed from its ash constituents, and if necessary from the mineral substances which had been initially added thereto, by any suitable treatment, such as washing with hydrochloric acid.

It has been attempted to apply this method, using brown coal or lignite as the starting material, but this known process is tedious, because on the one hand a large quantity of wash water is necessary for removing from the activated carbon the residue of the hydrochloric acid, and on the other hand it is necessary to subject the activated charcoal freed from ash in said manner, to a second heat treatment, in order to secure an afteractivation.

According to my improved process, I can secure a highly activated carbon in a single heat treatment from brown coal, lignite, peat, wood or other plant materials containing cellulose, said starting material being preferably in the form of a powder or dust. According to my process, I remove the largest part of the ash-forming constituents from the starting material (brown coal, lignite, peat, wood or other plant materials containing cellulose) by washing said starting material with hydrochloric acid, prior to heating said starting material. The starting material freed from ash is then carbonized by subjecting the same to a high temperature. I prefer to have this carbonizing take place in the presence of an activating gas.

It has been known to produce carbon which is activated and which has adsorption properties, by finely pulverizing carbonaceous material, dissolving or dispersing the material, treating it under pressure with concentrated zinc chloride solutions, and then hydrolyzing by means of small quantities of hydrochloric acid or of sulphuric acid.

According to this process, only a very small percentage of hydrochloric acid was added or utilized, and this small percentage of hydrochloric acid was always used together with the zinc chloride solutions, and it only had the purpose of improving the hydrolysis.

According to my invention, I prefer to use hydrochloric acid alone, and in sufficient quantity in order to secure an entirely different purpose, namely, dissolving out the mineral constituents of the starting material.

It has also been proposed to treat very finely divided coal with a mixture of sulphuric and hydrochloric acids, in order to transform the metal compounds in the coal, into soluble salts and sulphates. It was then necessary to wash the coal, treat it with nitric acid, again wash the material, then treat it with hydrofluoric acid, and again wash the material. However, this method did not activate the carbon, and this method was used solely for producing carbon black, to be utilized as a pigment.

I prefer not to use sulphuric acid or any other acid (save hydrochloric acid) in carrying out my improved process, because the difficultly soluble salts which are produced by such acid other than hydrochloric acid make the purification extremely difficult.

According to my invention, I prefer to treat the brown coal, lignite, peat, wood or other plant materials containing cellulose with hydrochloric acid alone, in a single washing step, and to then activate the product. The end product is a finished and very active carbon.

Example No. 1

Raw brown coal, lignite, peat, wood or other plant materials containing cellulose, preferably in the form of a powder or dust which may be as finely divided as possible, is thoroughly intermixed with half its weight of concentrated hydrochloric acid. After several hours the lignite paste or dough is separated by means of a suction filter. To facilitate this, water can be added to the above mentioned mixture. The filtered product is then washed with water until the chlorine reaction has disappeared. In one case the ash content was lowered from 4.10% to 0.45%, by means of this treatment. The dried material which has thus been substantially freed from ash, is then preferably spread in the form of a thin layer, and it is subjected to a temperature of 800° C., while superheated steam is allowed to pass over the carbon. For producing an activated carbon of highest value the de-ashed material has to react with the steam in the form of a layer as thin as possible. If the layer is stationary, as in an ordinary retort, the thickness of the layer should not exceed 20 mm. If the layer is moved, as in a revolving furnace, the thickness of the layer can exceed 20 mm. The activation can be carried on in a retort made of metal as well as in a brick retort. The steam, preferably slightly superheated, is led through the retort at atmospheric or slightly increased pressure. The velocity of the steam should be controlled so that the reaction between the steam and the hydrogen and carbon monoxide which is produced by the carbon, is nearly quantitative. Therefore the velocity of steam must not to be too high. The length of this treatment depends upon predetermined conditions, according to the desired adsorption power of the activated carbon. I have found that the adsorption property is the best when the end product is from 15% to 20% of the lignite which has been used as a starting material.

A carbon which has been manufactured in the manner above mentioned, shows the following adsorption power:

a. One gram of the carbon adsorbed from 100 ccm. of a one-tenth normal iodine solution, iodine in the amount of 1.20% grams. That is, the activated carbon adsorbed 120% of its own weight.

b. 0.85 gram of the activated carbon was necessary for fully decolorizing 100 ccm. of a 15% solution of methylene blue.

c. 0.2 gram of the activated carbon decolorized a molasses solution up to 72%, while a highly valuable and special activated carbon of the ordinary kind only decolorized the same up to 60% under the same conditions.

According to my improved process, an absolutely neutral activated carbon is produced.

In some cases it may be desirable that the carbon should have a feeble acid reaction. I have found that this can be secured by adding thereto very small quantities of an acid which has low volatility, such as phosphoric acid.

It has been known that the presence in the activated carbon of the slightest residue of iron oxide is undesirable and injurious. Such traces of iron oxide can be present in the activated carbon in such form that it will not react with hydrochloric acid, but it will react with organic compounds which contain a hydroxide group.

Such types of coal, if treated for example by shaking the same with a solution of oxalic acid, also deliver iron in a form insoluble in hydrochloric acid.

I have discovered that by extremely careful saturation or neutralization of such traces of iron oxide with acids having low volatility (such as phosphoric acid, for example), I can eliminate these disadvantages. If the basic oxides, and more particularly iron oxide, are not quantitatively or wholly removed by treatment with the hydrochloric acid, I can produce suitable activated carbon from the lignite freed from ash, by adding to the de-ashed lignite, before it is carbonized, small quantities of acids having low volatility (phosphoric acid, for example). These quantities are such as to substantially correspond to the relative proportions in the formula $Fe_2O_3 : P_2O_5$.

Example No. 2

A lignite which had not been wholly freed from ash, and which had an ash content of 0.75%, had ash constituents which consisted of 0.45% $SiO_2$ and 0.30% $Fe_2O_3$. When this lignite was carbonized by being subjected to a temperature of 800° C. while a current of steam was passed over the same, an activated carbon was produced, which decolorized a molasses solution only up to 31%. However, if 0.26% of $P_2O_5$ was added to the lignite before it was carbonized, then the same method of production yielded an activated charcoal, which could decolorize the molasses up to 73%.

The following table clearly discloses the great advantages of the improved method, as contrasted with the methods which have been previously used. In making the tests which resulted in the figures given in said table, the same starting material was used. This was a raw lignite, secured from the Fortuna mines, near Cologne in Germany.

|  | Product made according to the improved method, the ash having been removed prior to heating | Product made by heating the coal and then de-ashing the same | Product made from coal which was not de-ashed |
| --- | --- | --- | --- |
| Absorption power for iodine | 120% | 100% | 110% |
| Removable ash | Up to 2% | Up to 4% | 25% and more. |
| Iron content | Less than 0.1% | About 1% | About 5%. |
| Wash water required | 0.5 cbm/100 kg. | 6 cbm/100 kg. |  |
| Hydrogen number (pH) | Neutral | Weakly alkaline. | Strongly alkaline. |
| Field of use | Practically unlimited. | Less | Limited. |
| Standardization for various purposes | Possible | Not as good. | Not possible. |
| Behavior against weakly alkaline sugar juices, alkalinity | Unchanged | Decreasing | Obviously increasing. |

I have shown a preferred embodiment of my invention, but it is clear that numerous changes and omissions could be made without departing from its spirit.

For example, it is not necessary that the preliminary washing with hydrochloric acid should completely remove the ash-constituents as long as such constituents are substantially removed so that a good activated carbon is produced.

I claim:

1. A method of producing activated carbon from lignite, which consists in first substantially removing the ash-forming constituents by washing the lignite with hydrochloric acid, and then carbonizing the product in the presence of an activating gas.

2. A method of producing activated carbon from lignite which consists in first substantially removing the ash-forming constituents by washing the lignite with hydrochloric acid, then adding to the purified lignite a small proportion of an acid having low volatility, and then carbonizing the lignite in the presence of an activating gas.

3. A method of producing activated carbon from lignite which consists in first substantially removing the ash-forming constituents by washing the lignite with hydrochloric acid, then adding to the purified lignite a small proportion of phosphoric acid, and then carbonizing the lignite by heat in the presence of an activating gas.

4. A method of producing activated carbon from lignite which consists in first substantially removing the ash-forming constituents by washing the lignite with hydrochloric acid, then adding to the purified lignite a small proportion of an acid having low volatility, and then carbonizing the lignite in the presence of an activating gas, the proportion of said acid which is added to the lignite corresponding substantially to the amount which is required for combining with the iron oxide, in order to form a chemical compound with said iron oxide.

5. A method of producing activated carbon from lignite which consists in first treating the lignite with hydrochloric acid in order to remove therefrom a substantial part of the ash-forming constituents, and then heating the purified lignite in order to carbonize the same.

6. A method of producing activated carbon from lignite which consists in first treating the lignite with hydrochloric acid in order to remove therefrom a substantial part of the ash-forming constituents, and then heating the purified lignite in order to carbonize the same, said heating being carried on in the presence of an activating gas.

WALTER FUCHS.